UNITED STATES PATENT OFFICE.

CARL DUISBERG, OF ELBERFELD, GERMANY, ASSIGNOR TO THE FARBEN-FABRIKEN, VORMALS FR. BAYER & CO., OF SAME PLACE.

ORANGE DYE.

SPECIFICATION forming part of Letters Patent No. 447,303, dated March 3, 1891.

Application filed October 29, 1890. Serial No. 369,742. (Specimens.) Patented in Germany April 23, 1887, No. 44,797.

*To all whom it may concern:*

Be it known that I, CARL DUISBERG, doctor of philosophy, chemist, and assignor to the FARBENFABRIKEN, VORMALS FR. BAYER & Co., in Elberfeld, a subject of the Emperor of Germany, residing in Elberfeld, Germany, have invented a new and useful Improvement in the Manufacture of a New Substantive Orange Coloring-Matter, (for which the FARBENFABRIKEN, VORMALS FR. BAYER & Co., have obtained Letters Patent in Germany, dated April 23, 1887, No. 44,797,) of which I give in the following a clear and exact description.

My invention relates to the manufacture of a new substantive orange coloring-matter for dyeing cotton, wool, and silk by the action of one molecule of tetrazo-diphenyl with one molecule of salicylic acid to the so-called "intermediate product" and combining this with one molecule of naphthylamine monosulpho-acid.

In carrying out my invention practically I proceed as follows: Twenty pounds of benzidine sulphate suspended in a finely-comminuted condition in one hundred and fifty (150) liters of water are mixed with forty (40) pounds of muriatic acid of 21° Baumé. To this ten (10) pounds of sodium nitrite dissolved in water are slowly added under cooling with ice and continual stirring. The benzidine sulphate insoluble in water dissolves gradually and a clear solution of tetrazo-diphenyl chloride forms. The thus-obtained tetrazo compound runs into a solution of ten (10) pounds of salicylic acid dissolved in soda and the following reaction takes place:

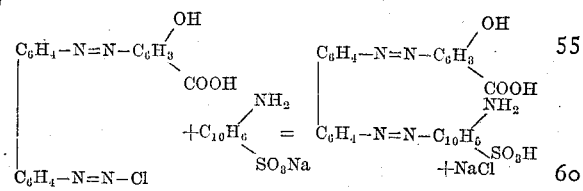

A brown yellow precipitate of an intermediate product separates, which is no dye-stuff, but has a free diazo group to combine with phenols or amines to dye-stuffs. If all the tetrazo-diphenyl is combined with the salicylic acid a solution of forty (40) pounds of the soda salt of a naphthylamine monosulpho-acid (naphthionic acid) is added, and the reaction goes on according to the following equation:

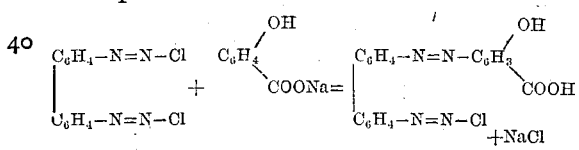

The reddish-brown precipitate which is now formed is allowed to stand for about twenty-four hours, being repeatedly stirred. Then it is heated, filtered, and dried.

My new coloring-matter forms a reddish amorphous powder, which is easily soluble in water with an orange color. In concentrated sulphuric acid it dissolves with blue color, giving a black precipitate when water is added. A black precipitate is also formed on adding acetic or mineral acid to the orange-colored watery solution. It dyes unmordanted cotton a splendid reddish orange in a boiling soap bath, and has the following composition:

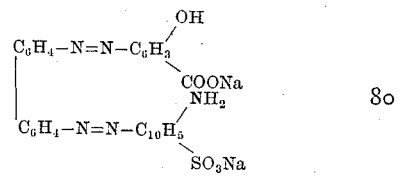

Having thus described my invention, what I claim as new, and desire to secure by Letters Patent, is—

1. The process for producing the coloring-matter herein described by combining one molecule of tetrazo-diphenyl with one molecule of salicylic acid to an intermediate product and combining this with one molecule of naphthylamine monosulpho-acid.

2. As a new product, the new orange dyeing coloring-matter herein described, having the following properties: is easily soluble in water, the watery solution being darkened by weak acetic acid and precipitated by mineral acid; in concentrated sulphuric acid it dissolves with blue color and has the chemical formula: $C_{29}H_{19}N_5SO_6Na_2$.

CARL DUISBERG.

Witnesses:
WILLIAM M. ILIFF,
WM. A. POLLOCK.